United States Patent Office 3,150,536
Patented Sept. 29, 1964

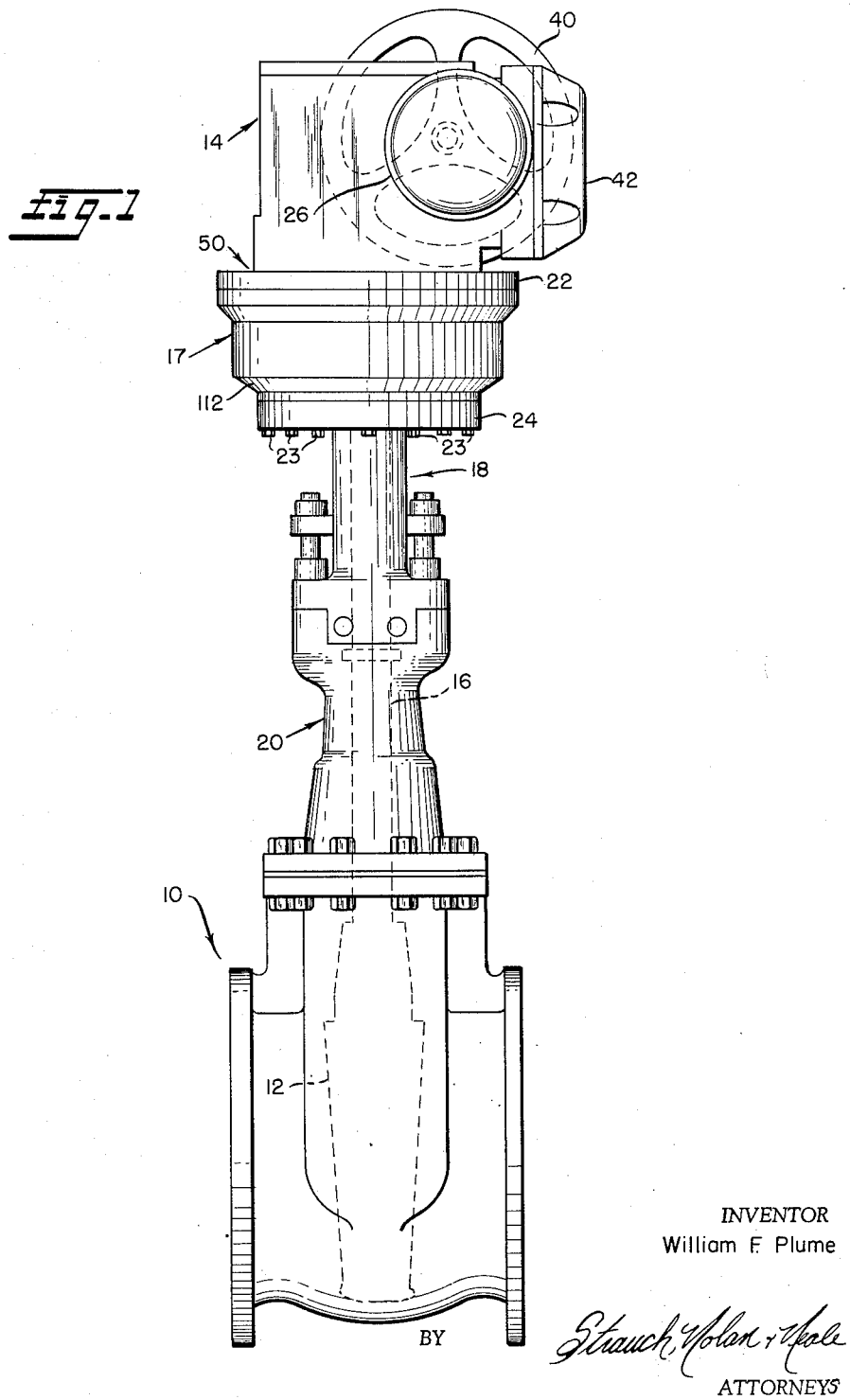

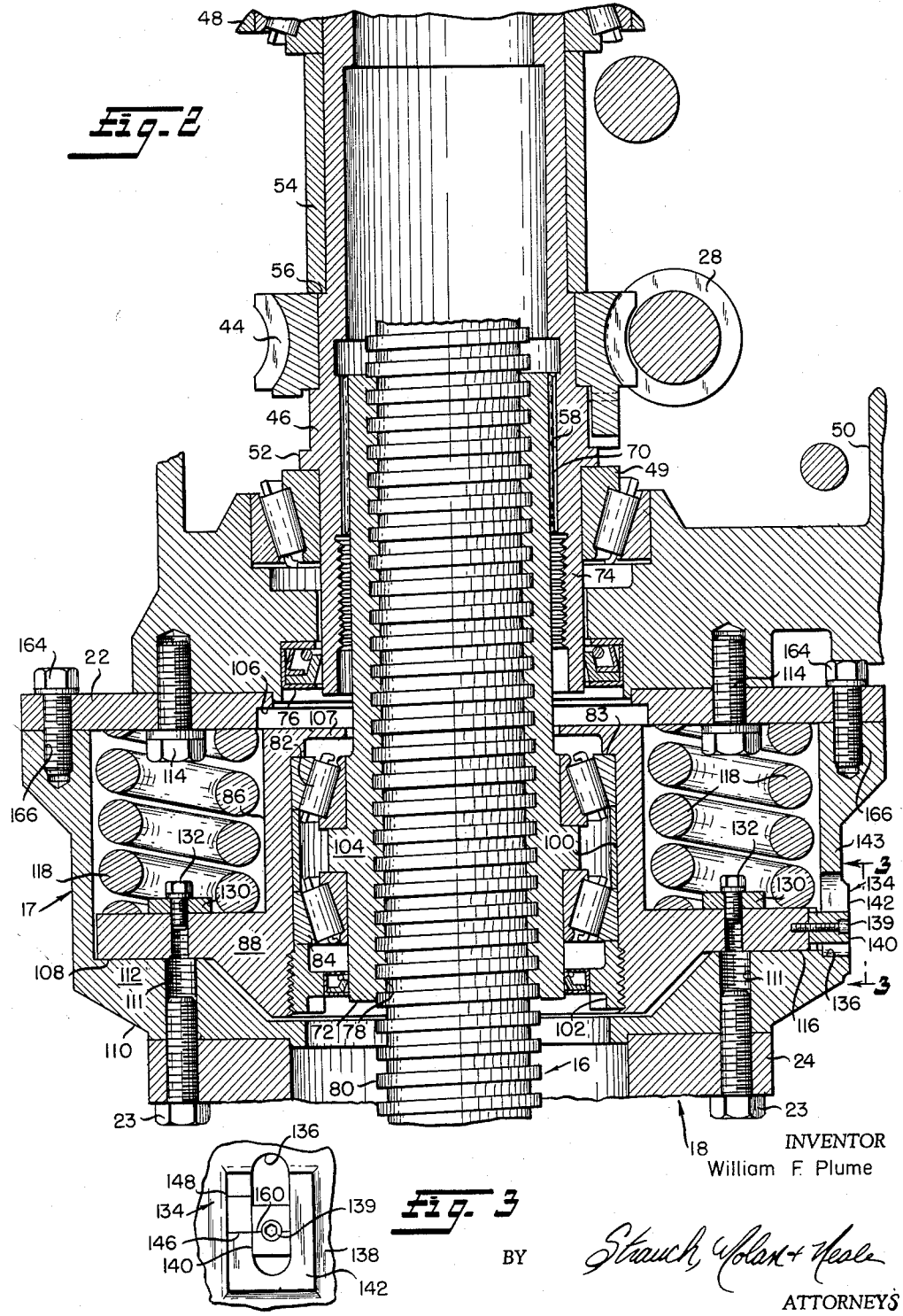

3,150,536
VALVE ASSEMBLY COMPONENT
William F. Plume, Wheaton, Ill., assignor, by mesne assignments, to Link-Belt Company, a corporation of Illinois
Filed July 11, 1961, Ser. No. 123,256
12 Claims. (Cl. 74—424.8)

This invention relates to valve assemblies and, more particularly, to an improved compensating spring assembly for relieving stresses on a valve stem having its longitudinal movement limited by a fixed abutment; and to a novel adapter plate for incorporating a compensating spring assembly into an existing valve assembly.

A valve of the type with which a compensating spring assembly is employed is typically a gate valve driven by an electric or fluid motor controlled, in part, by limit switches or valves which deactivate the motor when the gate engages its seat. However, the motion transmitting elements of the valve operator may, after the motor is deactivated, continue in motion, thus seating the gate with excessive force. The undesirable forces resulting from overrun must be relieved to prevent damage to the gate and its seat.

Additionally, valves of this type are often employed to control the flow of fluids at widely varying temperatures. A hot fluid flowing through such a valve will tend to cause an expansion of the valve components with which it has heat exchange relationship, including the valve seat, the gate and the stem. Again, thermal expansion of these components will produce undesirable excessive forces which must be relieved or damage will result.

A compensating spring assembly which functions to relieve these undesirable stresses, in one form conventionally includes a threaded stem nut which engages a threaded valve stem, the stem nut, under normal operating conditions, being axially fixed so that the valve stem will move axially as the nut is rotated. To relieve the stresses discussed above, a conventional compensating spring assembly has the stem nut axially fixed on, and journalled for rotational movement in, a spring support which is biased into engagement with a fixedly positioned structural member by a plurality of springs extending between the structural member and the spring support. The structures shown in United States Patent No. 2,351,211 to Hodgson, issued June 13, 1944, for Drive for Valves and the Like and United States Patent No. 2,150,813 to Ball, issued March 14, 1939, for Compensating Device for Valve Control are typical of such prior art devices.

It is desirable, in devices as described above, to prevent rotation of the spring support in order to avoid misalignment of the biasing springs. In previously employed compensating spring assemblies, cumbersome and difficult-to-assemble structural members were employed for this purpose. In one aspect of the present invention, a simple, inexpensive, easily replaced key, which cooperates with a suitable slot in a fixedly positioned spring support housing, accomplishes the same results as the more expensive and less accessible prior art devices.

In a compensating spring assembly, as described above, it is desirable to provide an accurate indication of the deflection of the spring support so that the operator may, if abnormal deflection is indicated, adjust the position of the valve or vary the operation of the valve control. The prior art devices employed for this purpose comprised complicated mechanical linkages operatively connected between the spring support and a pointer which indirectly indicated the amount of deflection. Such indicators were expensive to manufacture and assemble and, more important, tended to give false readings as the components of the linkage became worn. In another aspect of the present invention, therefore, the same simple slot and key arrangement which is employed to prevent rotation of the spring support is further utilized to give a direct and accurate indication of the amount of spring support deflection.

In addition, the prior art devices are difficult to assemble into existing valve assemblies which it was deemed desirable to equip with compensating spring assemblies. In a third aspect of this invention, a simple, easily fabricated adapter plate provides a convenient and versatile means of assembling a compensating spring assembly into an existing valve assembly. Additionally, a suitable splined connection is provided for meshing the complementary motion transmitting members of the valve control and the spring compensating assembly, thereby further facilitating the assembly process.

It is a primary object of this invention to provide an improved compensating spring assembly having an inexpensive, easily assembled, slot and key arrangement for maintaining the spring support non-rotatable.

In conjunction with the foregoing object, it is a further object of this invention to utilize the same slot and key arrangement to provide a novel, simple and extremely accurate indication of the deflection of the spring support.

A further primary object of this invention resides in the provision of a novel adapter plate which permits a compensating spring assembly to be readily assembled into an existing valve assembly. In conjunction with this object, it is a further object to provide a novel splined connection between the motion transmitting elements of the compensating spring assembly and the valve control for further facilitating the assembly process.

Further novel features and other objects of this invention will become apparent from the following detailed description, discussion, and the appended claims taken in conjunction with the accompanying drawings showing a preferred structure and embodiment, in which:

FIGURE 1 is a side view of a complete valve assembly incorporating the compensating spring assembly of the present invention;

FIGURE 2 is a sectional side view to an enlarged scale of the compensating spring assembly and a fragmentary portion of a valve control of the type shown in FIGURE 1; and FIGURE 3 is a fragmentary view taken substantially along line 3—3 of FIGURE 2 showing the novel spring support deflection indicator.

The major components of an exemplary valve assembly with which the compensating spring assembly is used, as shown in FIGURE 1, include a valve body 10 within which is disposed a gate, disc, or similar type valve closure element 12, a valve operator 14, an upwardly extending valve stem 16 operatively connected between the valve and the valve operator, and a support for the valve operator comprising an upper yoke assembly 18 and a lower yoke assembly 20. In the present invention, a compensating spring assembly 17 is disposed between valve operator 14 and upper yoke assembly 18 and is secured to these components by, respectively, an adapter plate 22 and screws 23 extending through mounting flange 24 of yoke assembly 18.

Valve operator 14 includes an electric motor 26 which rotates a worm 28 (shown in FIGURE 2), a conventional hand wheel 40 which is selectively alternatively operable to also rotate the worm 28, and conventional position limit and torque limit switches (not shown) which are mounted on the side of the housing under a cover 42.

As may be seen in FIGURE 2, worm 28 is meshed with, and drives, a worm wheel 44 which is rotatably fixed to a drive sleeve 46. Drive sleeve 46 is journalled for rotational movement in opposed upper and lower tapered roller thrust bearings 48 and 49, the outer races of which are fixedly mounted in valve operator housing 50. Axially downward movement of drive sleeve 46 is prevented by the axial abutting engagement of an annular projection of flange 52 on drive sleeve 46 with the inner race of roller thrust bearing 49. Spacing sleeve 54, axially interposed between the inner race of roller bearing 48 and the upper face of worm wheel 44 and an annular horizontal shoulder abutment 56 on drive sleeve 46, prevents upward axial movement of drive sleeve 46.

Located on drive sleeve 46 intermediate the ends thereof are vertically extending internal splines 58 which engage complementary vertically extending external splines 70 on a stem nut 72. Nut 72 therefore rotates with drive sleeve 46 while being free for axial movement relative thereto. This connection constitutes an important featur of this invention as it permits the compensating spring assembly 17 to be easily and rapidly assembled to the valve control as will hereinafter be explained in more detail.

Subjacent splines 58 of drive sleeve 46 is a threaded portion 74 adapted to receive a sleeve nut (not shown) when the valve operator 14 is employed in a valve assembly without a compensating spring assembly 17 in the manner explained in copending application No. 146,648 filed October 20, 1961, by William F. Plume for Valve Control. Secured to housing 50 and surrounding the lower end of drive sleeve 46 is an oil seal 76 which prevents oil or grease from leaking from valve operator 14.

Internal threads 78 on stem nut 72 continuously engage external threads 80 on valve stem 16. Thus, as stem nut 72 is rotated by drive sleeve 46, valve stem 16 will (depending upon direction of rotation) move downward or upward causing gate 12 to move toward or away from its seat.

Valve stem nut 72 is journalled for rotation by opposed tapered roller bearings 82 and 84 which are disposed within an annular upstanding wall or sleeve 86 of a spring support 88.

More specifically, the upper end face of the outer race of roller bearing 82 abuts an annular horizontal shoulder 83 extending inwardly from the upper end of the spring support sleeve 86. The axial spacing between the outer races of bearings 82 and 84 is established by a cylindrical spacer 100 which abuts roller bearings 82 at its upper end and extends downward into abutting engagement with roller bearings 84. A sleeve nut 102 rigidly clamps the outer races of bearings 82 and 84 and spacer 100 against the annular spring support shoulder 83.

A radial annular flange 104 intermediate the ends of stem nut 72 extends between and abuts the inner races of roller bearings 82 and 84 and axially fixes stem nut 72 with respect to the spring support 88. Stem nut 72 is thus free to rotate about its vertical axis relative to spring support 88 which is maintained non-rotatable by a mechanism hereinafter described.

Upstanding sleeve wall 86 of spring support 88 terminates in an inwardly directed horizontal wall 107 spaced below an annular notch 106 in adapter plate 22. Spring support 88, therefore, may move axially between an upper limit defined by the engagement of its top wall 107 with the horizontal shoulder of notch 106 and a lower limit defined by the engagement of its bottom face 108 with bottom wall 110 of a cup-shaped compensating spring assembly housing 112 which carries spring support 88.

Biasing springs 118, which seat at their lower ends on the top face of a horizontally disposed, outwardly directed, annular radial flange 116 at the lower end of spring support 88 an dextend upwardly against the lower surface of adapter plate 22, bias spring support 88 into engagement with bottom wall 110 of housing 112. Though only two springs are shown, it is to be understood that at least three equiangularly spaced springs are employed and, further, that the number of such springs may exceed three if desired. The upper end of the springs 118 are prevented from shifting laterally by screws 114 and lateral shifting of the lower ends is prevented by spacers 130 which are fastened to spring support 88 by screws 132.

It is essential that spring support 88 be maintained nonrotatable relative to the housing 112 and adapter plate 22 in order to prevent misalignment of the ends of springs 118. This is accomplished in the present invention by a simple slot and key arrangement 134. In this arrangement a vertically elongated slot 136 is provided in side wall 138 of housing 112. Extending through slot 136 and fastened to spring support 88 by a screw 139 is a rectangularly sectioned key 140, dimensioned to provide a close, free fit which enables key 140 to slide within the slot. Key 140 then (see FIGURE 2) will shift axially with the spring support 88 but the close fit of key 140 within slot 136 will maintain spring support 88 non-rotatable.

Slot and key arrangement 134, additionally, is utilized to provide an accurate indication of the displacement of spring support 88 upwardly within housing 112. To this end, an indicator marking surface 142 is provided on side wall 143 of housing 112. The outer end of key 140 which, as was discussed above, extends through vertical slot 136 in housing side wall 138 is flush with marking surface 142. Horizontal, vertically spaced apart marks or indices 146 and 148 on marking surface 142 and an index 160 on key 140 are arranged so that indices 146 and 160 are aligned when spring support 88 is seated on bottom wall 110 of housing 112 and indices 148 and 160 are aligned when spring support 88 is displaced upwardly into abutment with the horizontal edge of notch 106.

Compensating spring assembly 17 is assembled to upper valve yoke 18 by threading stem nut 72 onto valve stem 16 until the lower surface of assembly housing bottom wall 110 abuts the upper surface of mounting flange 24 of yoke assembly 18. Compensating spring assembly 17 is then fastened in place by screws 23 which extend upwardly through mounting flange 24 into threaded engagement with drilled and tapped holes 111 in bottom wall 110. Valve operator 14 could, of course have been previously assembled to spring assembly 17.

In assembling valve operator 14 to the top of compensating spring assembly 17, upper adapter plate 22 is fastened to housing 50 with screws 114. Valve operator 14 is then lowered onto compensating spring assembly 17. Because of the complementary splines 58 and 70, drive sleeve 46 may be readily engaged with stem nut 72, thus facilitating the assembly process. When housing 50 is seated on adapter plate 22, it is secured in place with screws 164 which extend through apertures in plate 22 into threaded holes 166 in housing 112.

The operation of the valve assembly is as follows: The contacts of any conventional manual or automatic switching device are closed to complete a circuit to electric motor 26. As the shaft of motor 26 rotates, it rotates worm 28 which drives the power train comprising worm wheel 44, drive sleeve 46, and stem nut 72. If motor 26 is operated so as to cause stem nut 72 to rotate clockwise (looking toward gate 12), stem nut 72 will, acting through the meshed screw threads 78 and 80, cause valve stem 16 to move in a downward, valve-closing direction.

As was explained above, overrun of the moving parts in the power train may cause valve-closing torque to be exerted on valve stem 16 after gate 12 is seated. However, since complementary splines 58 and 70 permit axially upward movement of stem nut 72, the torque produced by the overrun causes the stem nut to continue to rotate above valve stem 16 without exerting sudden, excessive, downward-acting, gate-seating force upon it.

As stem nut 72 rotates about the axially fixed valve stem 16, it and axially fixed spring support 88 move upward against the bias of springs 118, thereby dissipating the overrun-produced energy which would otherwise tend to act upon valve stem 16 and seat gate 12 with undue force.

Springs 118 will, when valve stem 16 subsequently moves upward, bias spring support 88 and stem nut 72 downward until spring support 88 is again seated on bottom wall 110.

Similarly, if while gate 12 is seated, an increase in temperature should cause valve stem 16 to expand, it will expand upward, causing stem nut 72 and spring support 88 to move upward, thereby relieving the stress on stem 16. Also when stem 16 cools more rapidly than the surrounding parts, gate 12 will be maintained firmly seated by partially compressed springs 118.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve assembly, a compensating spring assembly comprising; a hollow housing adapted to encircle a valve stem and having spaced apart top and bottom walls and an interconnecting external upstanding wall means structurally integral with said bottom wall and having a vertically elongated slot therein, means for detachably securing said top wall to said upstanding wall means to provide a self-contained compensating spring assembly a valve stem nut carrying spring support means disposed interiorly of said housing and adapted to move axially therein, spring means on said housing operably biasing said support toward a predetermined position relative to the bottom wall of said housing, detachable circumferential positioning means fixed to said spring support means and extending outwardly through said slot in sliding engagement with the edges of said slot, whereby said support means may move axially of said housing but is maintained non-rotatable therein.

2. The compensating spring assembly of claim 1, wherein said detachable positioning means comprises a horizontally extending key and means for detachably securing said key to said spring support.

3. The compensating assembly of claim 2 wherein said detachable securing means comprises a screw extending from the exterior of said housing inwardly through said key and threadedly received in said spring support.

4. In a valve assembly, a compensating spring assembly comprising: hollow housing means adapted to encircle a valve stem and having spaced apart top and bottom walls and an interconnecting external upstanding wall means structurally integral with said bottom wall having a vertically elongated slot with parallel side edges therein, means for detachably securing said top wall to said upstanding wall means to provide a self-contained compensating spring assembly, a valve stem nut carrying spring support means disposed interiorly of said housing means and adapted to move axially therein, spring means on said housing means operably biasing said support means toward a predetermined position relative to the bottom wall of said housing means, detachable circumferential positioning means fixed to said spring support means and extending outwardly through said slot in sliding engagement with the edges of said slot, whereby said support means may move axially of said housing means but is maintained non-rotatable therein, and means disposed on said housing means and cooperating with said positioning means whereby said positioning means provides a direct measure of the vertical displacement of said support means from a predetermined normal position.

5. The compensating spring assembly of claim 4 wherein said means disposed on said housing means includes two vertically spaced apart indices and said key has an index on its outer end, the alignment of the index on said key and one of said vertically spaced apart indices providing an indication that said spring support means is in a normal position, and the alignment of said index on said key and the other of said vertically spaced apart indices indicating maximum vertical displacement of said support means.

6. In a valve assembly, a valve body with support means at the upper end thereof, a valve operator spaced above said support means, and a compensating spring assembly disposed between said support means and said valve operator, means for rigidly attaching said assembly to said support means and means for attaching said valve operator to said assembly, said last-named means comprising a horizontally disposed adapter plate disposed between and rigidly secured to said operator and to said assembly; said support means having locating means and said compensating spring assembly and said valve operator having locating means complementary to the locating means of said support means, whereby either said compensating spring assembly or said valve operator may be assembled directly to said support means; said adapter plate having locating means complementary to the locating means of said valve operator for positioning said operator relative to said compensating spring assembly.

7. The valve assembly of claim 6 wherein said valve operator includes a vertically extending splined drive sleeve and said compensating spring assembly includes a vertically extending, complementary splined stem nut, whereby said splines on said drive sleeve and said stem nut may be readily drivingly engaged and said operator and said assembly may then move axially of each other, thereby facilitating the assembly of said valve operator to said assembly.

8. In a valve body incorporated valve assembly, a support having a horizontally disposed annular mounting member and a valve operator and a compensating spring assembly each having an annular horizontal seat member complementary to said mounting member and an annular flange depending from said seat member and adapted to engage a vertical surface on said mounting member, whereby either said valve operator or said compensating spring assembly may be fixed directly to said support; an adapter for assembling said compensating spring assembly between said valve operator and said seat member, said adapter comprising annular plate means having a vertical surface adapted to be engaged by said annular flange, means for rigidly attaching said adapter to said seat member, and means for attaching said plate to said compensating spring assembly.

9. A valve compensating spring assembly comprising a cup-shaped housing having a centrally-apertured end wall and side wall means extending from the periphery of said apertured end wall, an annular adapter plate of substantially the same outside diameter as said side wall secured to the end thereof opposite said end wall, and a spring support disposed within said housing, said support having an annular, substantially radial, flange portion juxtapositioned to said end wall of said housing and a central sleeve portion extending upwardly from said annular portion and terminating a predetermined spaced distance below said adapter plate and being substantially coaxial with said aperture, whereby said spring support may move in a substantially fixed path in said housing between said end wall and said adapter plate, said adapter plate having a portion thereof disposed into the path of movement of said spring support whereby the top of said cylindrical portion can engage the bottom of said adapter plate.

10. The valve compensating spring assembly of claim 9 wherein a plurality of biasing means extend between said adapter plate and said annular flange portion of said spring support and bias said spring support into engagement with said end wall of said housing.

11. The valve compensating spring assembly of claim 9 wherein a valve stem nut is disposed coaxially within said spring support sleeve portion and journalling means cooperate with said nut and sleeve to rotatably maintain said stem nut in axially fixed disposition relative to said sleeve.

12. The valve compensating spring assembly as defined in claim 11, wherein means rigidly secured to said spring support cooperate with said housing to maintain said spring support non-rotatable relative to said housing and enable axial movement of said spring support within said housing.

References Cited in the file of this patent

UNITED STATES PATENTS

| | | |
|---|---|---|
| 2,150,813 | Ball | Mar. 14, 1939 |
| 2,351,211 | Hodgson | June 13, 1944 |
| 2,933,937 | Kron et al. | Apr. 26, 1960 |